(12) United States Patent
Gong

(10) Patent No.: US 12,066,524 B2
(45) Date of Patent: Aug. 20, 2024

(54) RADAR DATA PROCESSING METHOD, TERMINAL DEVICE, AND COMPUTER-READABLE STORAGE MEDIUM

(71) Applicant: SUTENG INNOVATION TECHNOLOGY CO., LTD., Shenzhen (CN)

(72) Inventor: Changsheng Gong, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 68 days.

(21) Appl. No.: 17/893,110

(22) Filed: Aug. 22, 2022

(65) Prior Publication Data
US 2023/0059799 A1 Feb. 23, 2023

(30) Foreign Application Priority Data
Aug. 23, 2021 (CN) .......................... 202110966919.6

(51) Int. Cl.
*G01S 13/08* (2006.01)
*G01S 7/4863* (2020.01)
*G01S 13/86* (2006.01)
*G01S 17/08* (2006.01)

(52) U.S. Cl.
CPC ............ *G01S 13/865* (2013.01); *G01S 13/08* (2013.01); *G01S 17/08* (2013.01); *G01S 7/4863* (2013.01)

(58) Field of Classification Search
CPC ...... G01S 13/08; G01S 13/865; G01S 7/4863; G01S 17/08
See application file for complete search history.

(56) References Cited

U.S. PATENT DOCUMENTS

| | | | |
|---|---|---|---|
| 11,753,042 B1 * | 9/2023 | Subasingha | G01S 7/4013 701/25 |
| 2013/0321823 A1 * | 12/2013 | Takahashi | G01B 11/2513 356/601 |
| 2019/0391266 A1 | 12/2019 | Mori et al. | |
| 2020/0300978 A1 * | 9/2020 | McGuire | G01S 17/10 |

(Continued)

FOREIGN PATENT DOCUMENTS

| | | |
|---|---|---|
| JP | 2008275331 A | 11/2008 |
| WO | 2020206602 A1 | 10/2020 |
| WO | 2021085128 A1 | 5/2021 |

*Primary Examiner* — Mohamed Charioui
*Assistant Examiner* — Dacthang P Ngo
(74) *Attorney, Agent, or Firm* — BAYES PLLC

(57) ABSTRACT

This application is applicable to the field of radar technologies, and provides a radar data processing method, a terminal device, and a computer-readable storage medium. The method includes: obtaining radar data collected by a receiving area array; if the radar data is saturated, performing data fusion processing based on a floodlight distance value to obtain a fusion result; and determining a distance of a target object based on the fusion result. The method can accurately obtain an actual distance of the target object, effectively reduce a measurement error, improve calculation accuracy, and resolve an existing problem of a large deviation of a measurement result when an actual echo waveform cannot be effectively restored because a signal received by the radar is over-saturated when a laser is directly irradiated on a target object with high reflectivity.

7 Claims, 12 Drawing Sheets

(56) References Cited

U.S. PATENT DOCUMENTS

| | | | | |
|---|---|---|---|---|
| 2021/0333394 A1* | 10/2021 | Pacala | .................... | G01S 7/4863 |
| 2022/0026544 A1* | 1/2022 | Wu | ......................... | G01S 17/08 |
| 2023/0051395 A1* | 2/2023 | Wilton | .................... | G01S 7/484 |

* cited by examiner

RADAR DATA PROCESSING METHOD, TERMINAL DEVICE, AND COMPUTER-READABLE STORAGE MEDIUM

CROSS-REFERENCE TO RELATED APPLICATION

The present application claims the benefit of priority to China Patent Application No. CN202110966919.6, filed on Aug. 23, 2021, the content of which is incorporated herein by reference in its entirety.

TECHNICAL FIELD

This application pertains to the field of radar technologies, and particularly relates to a radar data processing method, a terminal device, and a computer-readable storage medium.

BACKGROUND

A LiDAR is usually used in fields such as automated driving, transport vehicles, robots, and public smart transportation due to its advantages such as high resolution, high sensitivity, strong anti-interference ability, and all-weather availability.

Because there is no circuit for controlling gains in a fixed-gain LiDAR system, gains of a received signal of a receiver of a radar system cannot be adjusted, and emitting power of an emitting diode of the radar system also cannot be adjusted. Therefore, when a laser emitted by the emitting diode is directly irradiated on a target object with high reflectivity, a signal received by the receiver is saturated, which makes it impossible to restore an actual echo waveform, thereby further causing a problem of a relatively large difference between a measurement result and an actual distance.

SUMMARY

Embodiments of this application provide a radar data processing method, a terminal device, and a computer-readable storage medium, to resolve an existing problem of a large deviation of a measurement result when an actual echo waveform cannot be effectively restored because the signal received by the radar is over-saturated when a laser is directly irradiated on a target object with high reflectivity.

According to a first aspect, an embodiment of this application provides a radar data processing method, including:
  obtaining radar data collected by a receiving area array;
  if the radar data is saturated, performing data fusion processing based on a floodlight distance value to obtain a fusion result; and
  determining a distance of a target object based on the fusion result.

In an embodiment of the first aspect, if the radar data is saturated, the performing the data fusion processing based on the floodlight distance value to obtain the fusion result includes:
  determining a saturation depth based on the radar data;
  determining the number of floodlights based on the saturation depth;
  obtaining a floodlight distance value corresponding to each floodlight unit based on the number of the floodlights; and
  performing the data fusion processing based on the floodlight distance value to obtain the fusion result.

In an embodiment of the first aspect, the determining the number of the floodlights based on the saturation depth includes:
  inputting the saturation depth into a depth lookup table for searching to obtain the number of the floodlights corresponding to the saturation depth.

In an embodiment of the first aspect, the performing the data fusion processing based on the floodlight distance value to obtain the fusion result includes:
  inputting the floodlight distance value into a filter for processing to obtain the fusion result.

In an embodiment of the first aspect, the radar data is data obtained by controlling a LiDAR to scan in a preset scanning mode.

In an embodiment of the first aspect, after determining the distance of the target object based on the fusion result, the method further includes: if the radar data is not saturated, determining the distance of the target object based on the radar data.

In an embodiment of the first aspect, the radar data processing method further includes:
  correcting the distance value of the target object based on a distance between the floodlight unit and the target object and a distance between a receiving unit and the target object.

According to a second aspect, an embodiment of this application provides a terminal device, including:
  an obtaining unit, configured to obtain radar data collected by a receiving area array;
  a fusion unit, configured to: if the radar data is saturated, perform data fusion processing based on a floodlight distance value to obtain a fusion result; and
  a determining unit, configured to determine a distance of a target object based on the fusion result.

In an embodiment of the second aspect, the fusion unit includes:
  a depth determining unit, configured to determine a saturation depth based on the radar data;
  a floodlight determining unit, configured to determine the number of floodlights based on the saturation depth;
  a distance determining unit, configured to obtain a floodlight distance value corresponding to each floodlight unit based on the number of the floodlights; and
  a data fusion unit, configured to perform the data fusion processing based on the floodlight distance value to obtain the fusion result.

According to a third aspect, an embodiment of this application provides a terminal device, where the terminal device includes a processor, a memory, and a computer program stored in the memory and capable of running on the processor, where when the processor executes the computer program, the method according to the first aspect or any one of the optional embodiments of the first aspect is implemented.

According to a fourth aspect, an embodiment of this application provides a computer-readable storage medium, where the computer-readable storage medium stores a computer program, and when the computer program is executed by a processor, the method according to the first aspect or any one of the optional embodiments of the first aspect is implemented.

According to a fifth aspect, an embodiment of this application provides a computer program product, where when the computer program product runs on a terminal device, the terminal device performs the method according to the first aspect or any optional embodiment of the first aspect.

Compared with the related art, the embodiments of this application have the following beneficial effects.

The radar data processing method, the terminal device, the computer-readable storage medium, and the computer program product provided in the embodiments of this application have the following beneficial effects:

By determining whether the radar is saturated with the radar data it receives, when the radar data is saturated, the distance of the target object is determined by using a fusion result obtained based on a floodlight distance of irradiating the target object by a floodlight source, which can accurately obtain an actual distance of the target object, reduce a measurement error, improve calculation accuracy, and effectively resolve an existing problem of a large deviation of a measurement result when an actual echo waveform cannot be effectively restored because a signal received by the radar is over-saturated when a laser is directly irradiated on a target object with high reflectivity.

BRIEF DESCRIPTION OF DRAWINGS

To explain the technical solution in embodiments in this application, the following briefly introduces the accompanying drawings required to describe the embodiments or the related art. Obviously, the accompanying drawings in the following description are only some embodiments in this application. A person of ordinary skill in the art may still derive other drawings from these accompanying drawings without creative efforts.

DETAILED DESCRIPTION

For the purpose of illustration rather than limitation, the following describes specific details such as a specific system structure and technology, to facilitate a thorough understanding of the embodiments of this application. However, a person skilled in the art should understand that this application can also be implemented in other embodiments without these details. In other cases, detailed descriptions of well-known systems, apparatuses, circuits, and methods are omitted, to prevent unnecessary details from causing distraction from the description of this application.

It should be further understood that the term "and/or" used in this specification and appended claims of this application refers to any combination of one or more of the associated items listed and all possible combinations thereof, and inclusion of these combinations. In addition, in the descriptions of this specification and the appended claims of this application, the terms "first," "second," "third" and the like are merely intended for differential description, and should not be understood as any indication or implication of relative importance.

It should be further understood that reference to "an embodiment", "some embodiments", or the like described in this specification of this application means that one or more embodiments of this application include a specific feature, structure, or characteristic described with reference to the embodiments. Therefore, expressions such as "in an embodiment," "in some embodiments," "in some other embodiments," and "in some additional embodiments" appearing in different places in this specification do not necessarily indicate reference to the same embodiment, but mean "one or more but not all embodiments," unless otherwise specified in another way. The terms "include," "comprise," "have," and variants thereof all mean "including but not limited to," unless otherwise specified in another way.

A LiDAR is an automated remote sensing device for detection using a laser as an emitting light source and a photoelectric detection technology. A LiDAR can include parts such as an emitting unit, a receiving unit, a scanning control system, and a data processing system. A working principle of the LiDAR is that a detection signal is emitted to a target object, and after the detection signal reaches the target object, the target object reflects the detection signal to form an echo signal, and then the receiving unit can receive the echo signal and process the received echo signal, to obtain information such as distance, size, speed, and reflectivity of the target object.

Figure 1:
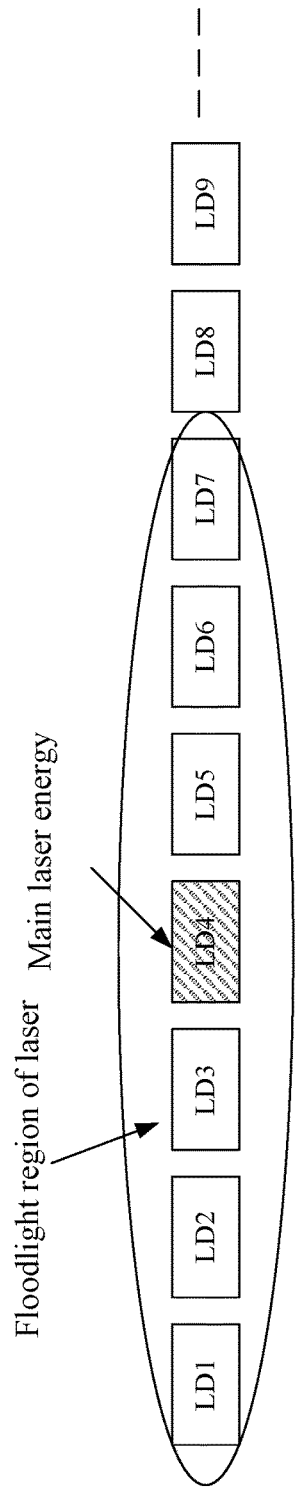
FIG. 1 is a schematic diagram of a floodlight energy range of an emitter of a radar according to this application.

In an area array LiDAR, the emitting unit includes multiple emitting diodes or emitting lasers (VECSEL sub-blocks). Main energy emitted by the emitting diodes or the emitting lasers corresponds to one or more blocks in a receiving area array of the receiving unit, and floodlight from the light irradiates an adjacent receiving array. For example, as shown in FIG. 1, assuming that light energy emitted by an emitting diode LD4 corresponds to a block 4 of a chip, and floodlight energy corresponds to a block 1, a block 2, a block 3, a block 5, a block 6, and a block 7. Assuming that when the LD4 irradiates an object with high reflectivity to make the block 4 over-saturated, the distance of the object with high reflectivity cannot be accurately measured by using echo data generated by the LD4 on the block 4. In addition, main energy of LD1, LD2, LD3, LD5, LD6, and LD7 does not irradiate the object with high reflectivity, and floodlight of the LD1, LD2, LD3, LD5, LD6, and LD7 irradiates the object with high reflectivity corresponding to the block 4. Because the floodlight has relatively small energy, the floodlight does not saturate the block 4 after irradiating the object with high reflectivity.

In view of this, an embodiment of this application provides a radar data processing method. By determining whether the radar is saturated with the received radar data, when the radar data is saturated, the distance of the target object is determined by using a floodlight distance of irradiating the target object by a floodlight source, which can accurately obtain an actual distance of the target object, reduce a measurement error, improve calculation accuracy, and effectively resolve an existing problem of a large deviation of a measurement result when an actual echo waveform cannot be effectively restored because a signal received by the radar is over-saturated when a laser is directly irradiated on a target object with high reflectivity.

The radar data processing method provided in this embodiment of this application is described in detail below.

Figure 2:
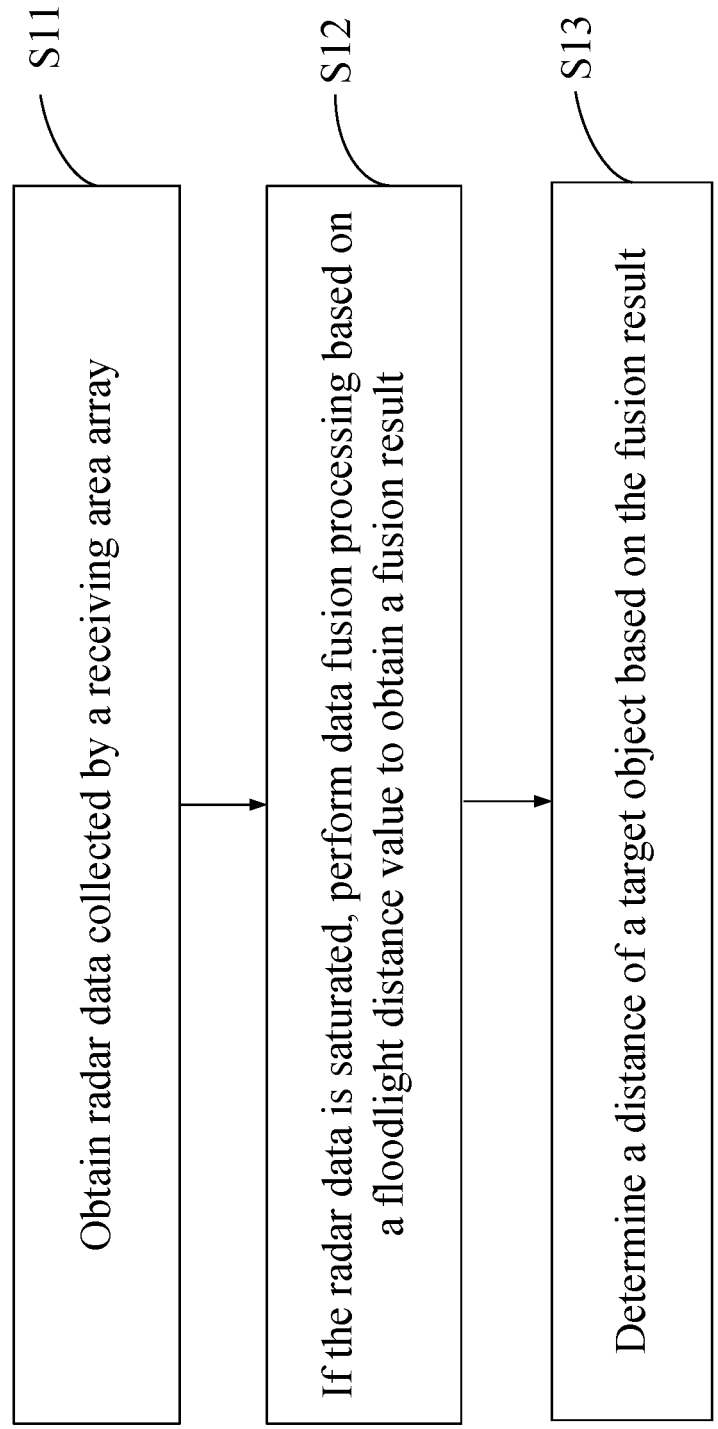
FIG. 2 is a schematic flowchart of a radar data processing method according to an embodiment of this application.

Referring to FIG. 2, FIG. 2 is a schematic flowchart of a radar data processing method according to an embodiment of this application. The radar data processing method provided in this embodiment of this application is performed by a terminal device that is communicatively connected to LiDAR. The terminal device may be a mobile terminal such as smartphone, tablet computer, or wearable device, or may be a device such as a computer, a cloud server, or a radar-assisted computer in various application scenarios. It should be noted that the radar data processing method provided in this embodiment of this application is mainly applicable to an area array LiDAR product and an array type LiDAR.

As shown in FIG. 2, the radar data processing method provided in this embodiment of this application may include step S11 to step S13. Details are as follows:

S11. Obtain radar data collected by a receiving area array.

In this embodiment of this application, the terminal device can control an emitting unit of the array LiDAR to emit a laser to scan a scanning area of the array LiDAR, and then receive echo data (that is, the foregoing radar data) reflected by an object in the scanning area by using the receiving area array of the receiving unit. After receiving the radar data, the LiDAR can in real time upload the radar data to a terminal device that communicates with the LiDAR, and the terminal device can also send a data obtaining request to the LiDAR in real time to obtain the radar data.

In an embodiment of this application, the terminal device may send a scanning instruction to the LiDAR to control the LiDAR to scan in a preset scanning mode, and to transmit back received radar data to the terminal device, so that the terminal device further performs data processing.

In an embodiment, the foregoing preset scanning mode means controlling an emitter (diode or laser) of the emitting unit to emit lasers in sequence, and controlling the receiving area array to receive an entire row of data until all array emitters of the emitting unit complete the emission.

Figure 3:
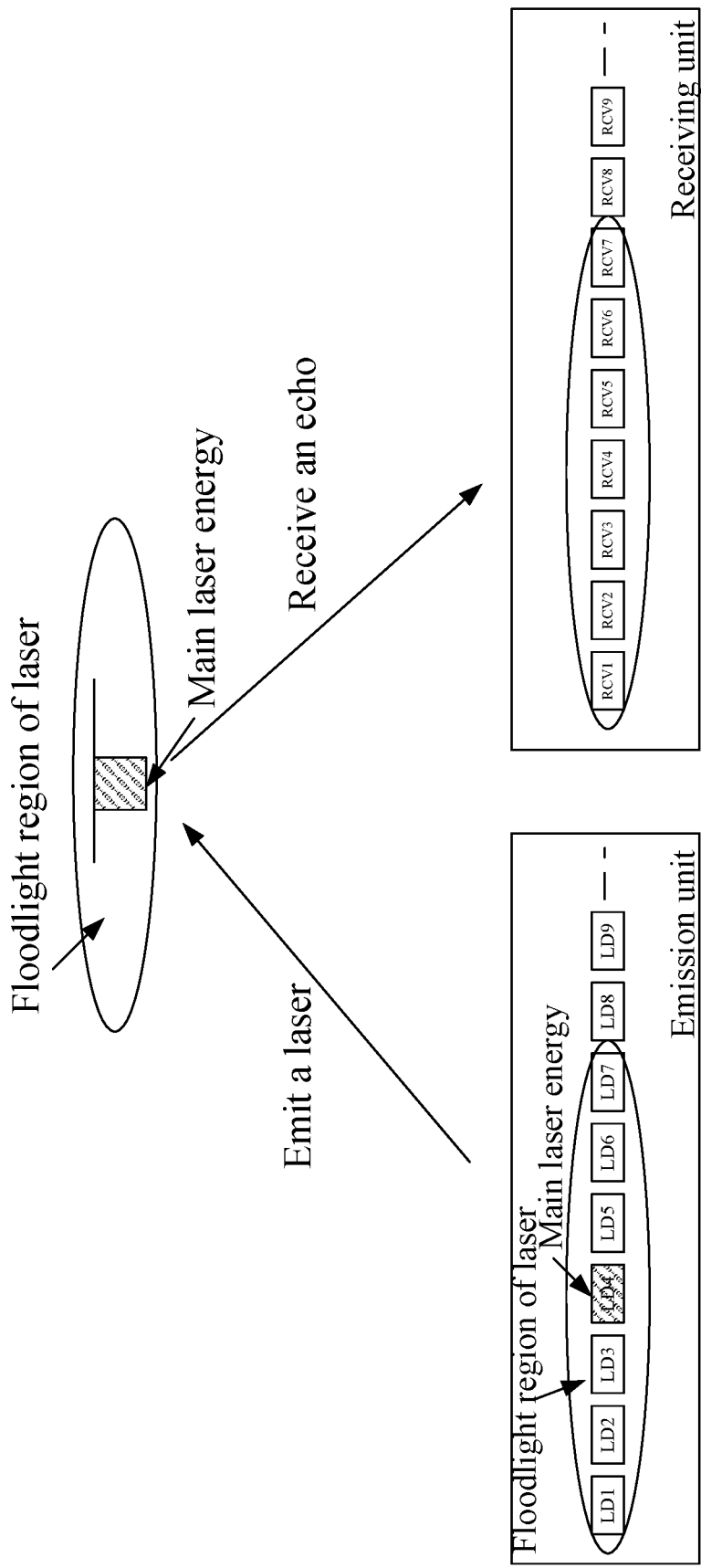
FIG. 3 is a schematic diagram of controlling of a preset scanning mode according to an embodiment of this application.

For example, referring to FIG. 3, taking a single-row emitter as an example, the LD1 is first controlled to start emitting a laser, an entire row of data is received; the LD2 is then controlled to start emitting a laser, an entire row of data is received; and next, the LD3 is controlled to start emitting a laser, and an entire row of data is received, and so on until the last LD of the same line emits a laser and completes scanning.

In this embodiment of this application, after obtaining the radar data, the terminal device may store the radar data in a memory.

S12. If radar data is saturated, perform data fusion processing based on a floodlight distance value to obtain a fusion result.

In this embodiment of this application, because the radar data is saturated, an actual echo waveform cannot be restored. To prevent data saturation from affecting a ranging result, in this embodiment of this application, the fusion processing is performed based on the floodlight distance value to obtain the fusion result for ranging.

In this embodiment of this application, after the radar data is obtained, whether the radar data is saturated can be determined based on the radar data. For example, a saturation threshold is set, and when the radar data exceeds the saturation threshold, it is determined that the radar data is saturated, otherwise the radar data is not saturated.

Specifically, an echo area value can reflect an intensity value of the echo. An echo area of the radar data is calculated, and if the echo area exceeds the saturation threshold, it indicates that the obtained radar data is saturated; or if the echo area does not exceed the saturation threshold, it indicates that the obtained radar data is not saturated. It can be understood that, the more the echo area exceeds the saturation threshold, the greater the saturation depth is; or the less the echo area exceeds the saturation threshold range, the less the saturation depth is. It should be noted that the foregoing saturation threshold may be determined based on device performance in the actual application process. This is not limited in this application.

It can be understood that whether the radar data is saturated can also be determined by calculating the echo intensity of the radar data. If the echo intensity exceeds the intensity threshold, it is determined that the obtained radar data is saturated, and in this case, the saturation depth can be calculated by collecting duration in which the echo intensity exceeds the intensity threshold; or if the echo intensity does not exceed the intensity threshold, it is determined that the obtained radar data is not saturated. It should be noted that the foregoing intensity threshold may also be set based on an actual application scenario. This is also not limited in this application.

It should be noted that the echo area and the echo intensity can be calculated in an existing calculation method. Details are not described in this application.

It should be noted that the floodlight distance value can be determined based on the radar data in step S11.

Figure 4:
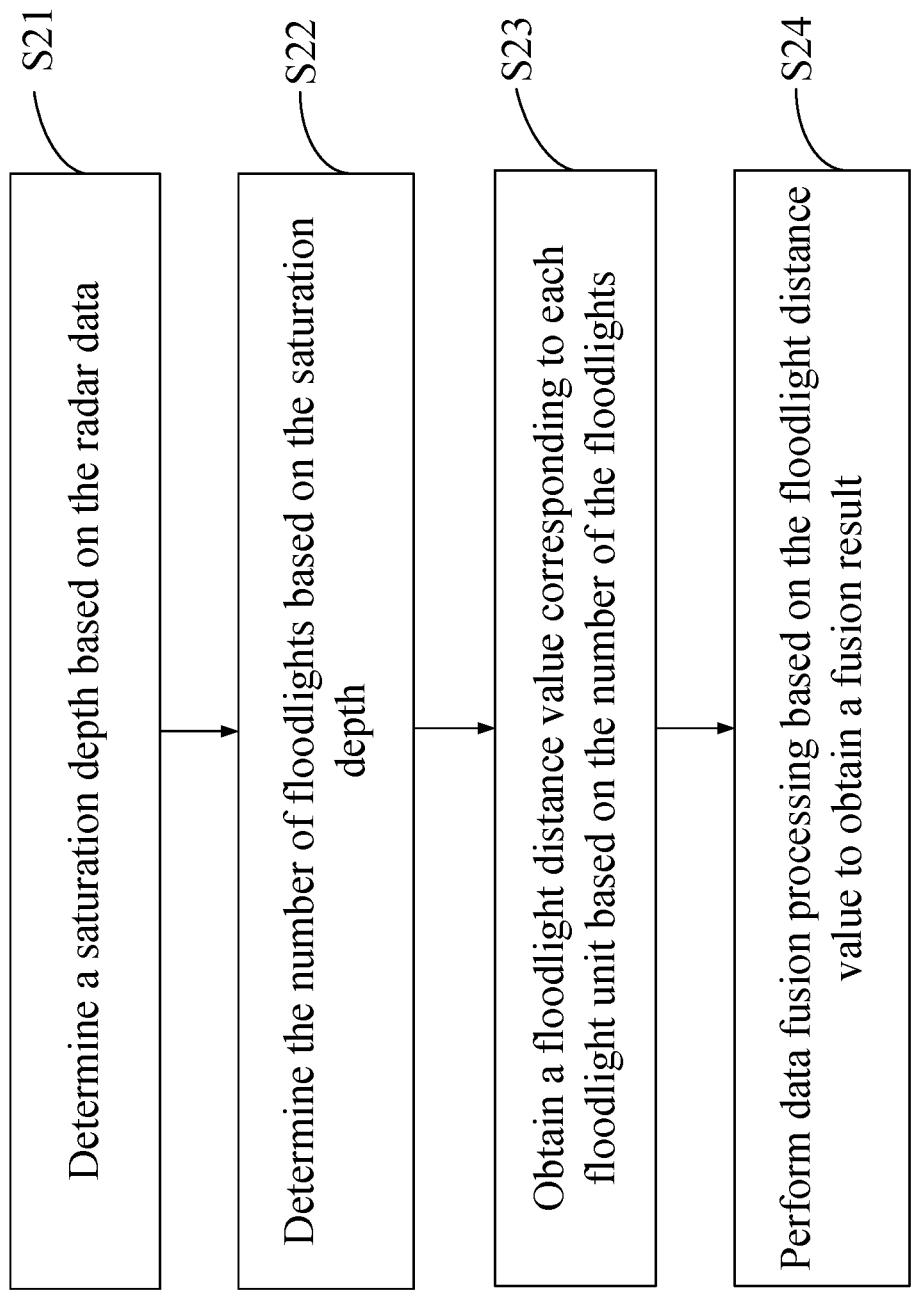
FIG. 4 is a schematic flowchart of implementation of step S12 according to an embodiment of this application.

Referring to FIG. 4, in an embodiment of this application, step S12 may include step S21 to step S24. Details are as follows:

S21. Determine a saturation depth based on the radar data.

In this embodiment of this application, there may be two methods of determining the saturation depth based on the radar data. In one method, the collected radar data is integrated, and the greater an integral value of the collected radar data is, the more saturated the radar data is. In the other method, duration in which the echo intensity exceeds the saturation threshold is calculated, the longer the duration is, the more saturated the radar data is.

Specifically, a corresponding saturation depth value can be set based on the integral value, or the corresponding saturation depth value can be set based on the duration in which the echo intensity exceeds the saturation threshold. The saturation depth can be determined correspondingly when the integral value of the radar data is determined or the duration in which the echo intensity exceeds the saturation threshold is determined. The saturation depth can also be determined based on a duration in which a pulse width for a main receiving unit to receive an echo exceeds the pulse-width saturation threshold. The pulse width generally refers to an interval in which the power of a radar echo is at or above a certain value. The certain value can be any value between the maximum and minimum powers of the S22. Determine the number of floodlights based on the saturation depth.

In this embodiment of this application, a depth lookup table may be determined based on the saturation depth and the number of the floodlights, and the number of the floodlights corresponding to the saturation depth is found through the depth lookup table. Specifically, the number of the floodlights can be determined by setting a saturation depth lookup table, and by inputting the saturation depth, the corresponding number of the floodlights can be determined. In addition, corresponding positions of the floodlights can also be found.

In specific application, the foregoing depth lookup table may be set based on an empirical value, and a preset depth lookup table may be stored in the terminal device and may be directly invoked when being queried.

Figure 5:
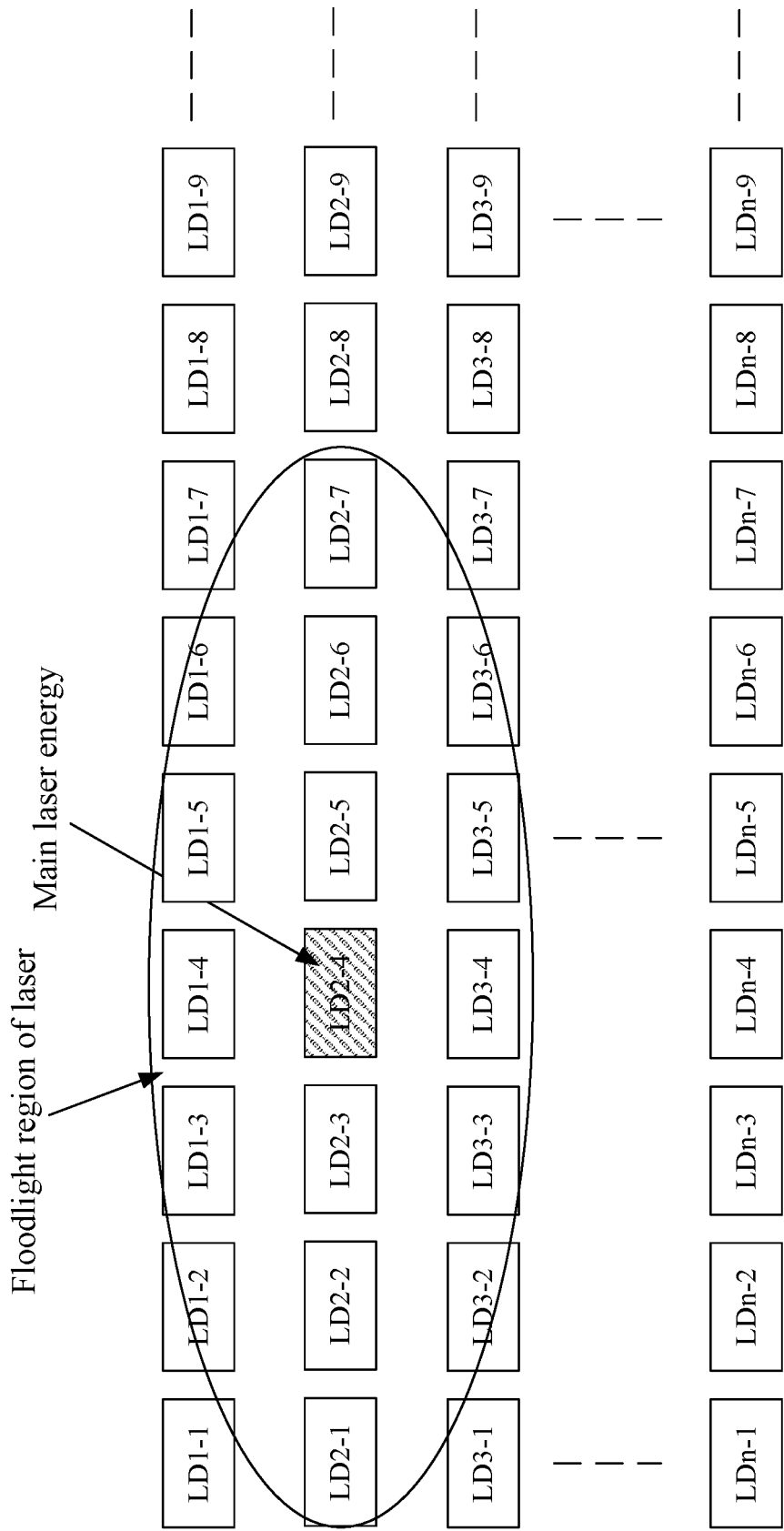
FIG. 5 is an exemplary scenario diagram for determining the number of floodlights based on a saturation depth according to an embodiment of this application.

Exemplarily, referring to FIG. 5, in an array, LD2-4 represents a main laser energy source. After a saturation depth of the main laser energy source is input, it is determined that there are 18 floodlights, and corresponding positions are LD1-2, LD1-3, LD1-4, LD1-5, LD1-6, LD1-7, LD2-1, LD2-2, LD2-3, LD2-5, LD2-6, LD2-7, LD3-2, LD3-3, LD3-4, LD3-5, LD3-6, and LD3-7 separately.

S23. Obtain a floodlight distance value corresponding to each floodlight unit based on the number of the floodlights.

In this embodiment of this application, the floodlight distance value is an entire row of received data after each emitter is controlled to emit in step S11. The obtaining the floodlight distance value based on the number of the floodlights is determining the floodlight distance value that needs to be read based on a position of the floodlight after the number of the floodlights is determined.

Figure 6:
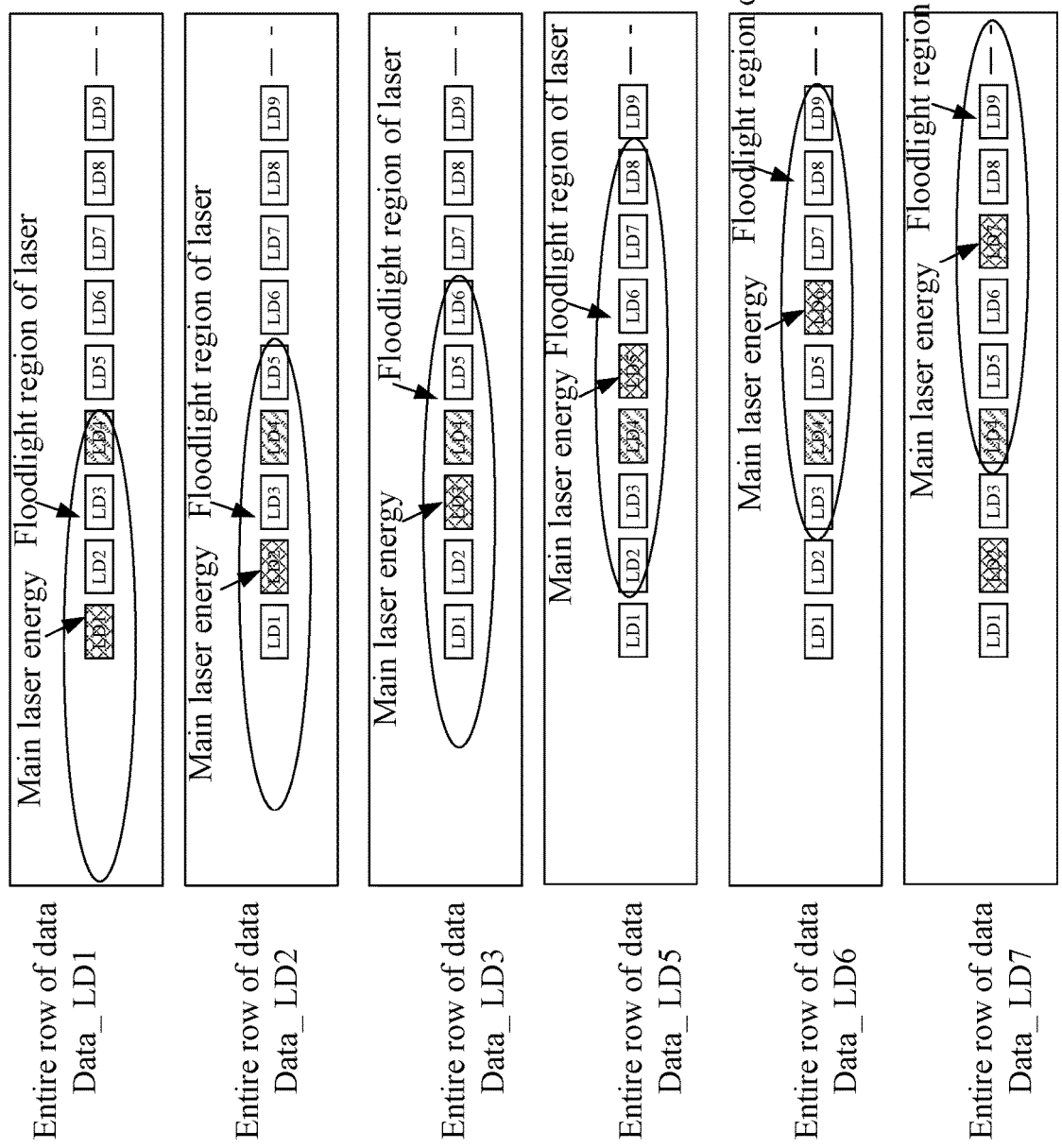
FIG. 6 is a schematic scenario diagram of a floodlight distance value according to an embodiment of this application.

For example, as shown in FIG. 6, assuming that floodlight units are LD1, LD2, LD3, LD5, LD6, and LD7 separately, floodlight distance values are separately an entire row of data Data_LD1 received by a receiving unit when the LD1 is started for emission scanning, an entire row of data Data_LD2 received by the receiving unit when the LD2 is started for emission scanning, an entire row of data Data_LD3 received by the receiving unit when the LD3 is started for emission scanning, an entire row of data Data_LD5 received by the receiving unit when the LD5 is started for emission scanning, an entire row of data Data_LD6 received by the receiving unit when the LD6 is started for emission scanning, and an entire row of data Data_LD7 received by the receiving unit when the LD7 is started for emission scanning.

S24. Perform data fusion processing based on the floodlight distance value to obtain a fusion result.

In this embodiment of this application, weight may be set based on a distance between the floodlight unit and a main emitting unit, and then a weighted average is calculated based on the floodlight distance value corresponding to each floodlight unit, to further obtain the fusion result.

For example, when the weight is set based on the distance between the floodlight unit and the main emitting unit, greater weight can be set for a floodlight distance value corresponding to a floodlight unit closer to the main emitting unit, and smaller weight can be seat for a floodlight distance value corresponding to a floodlight unit farther away from the main emitting unit. Fixed weight may be set based on experience, or the weight may be automatically set based on the number of the floodlight units and a floodlight condition of the floodlight unit. This is not limited in this application.

It should be noted that a set weight value can be adjusted based on multiple pieces of historical data (including different weight setting schemes and corresponding fusion results), to further obtain an optimal setting scheme.

It should be noted that matching (saturation depth lookup table) of the number of the floodlights can also be adjusted based on the multiple pieces of historical data (including different setting schemes for the number of floodlights and corresponding fusion results), to obtain an optimal matching scheme.

In this embodiment of this application, to further eliminate an error and calculation jitter, the floodlight distance value may be input into a filter for filtering processing, to obtain the fusion result.

In this embodiment of this application, the filter may be a digital filter, an average filter, a median filter, or an FIR filter. A specific filter type and a filter coefficient can be selected based on a parameter of an actual system. This is not limited in this application.

It should be noted that different algorithms are embedded in different filters. For example, an average calculation algorithm (which can be a weighted average algorithm in this case) is embedded in the average filter, and a corresponding fusion result can be directly calculated by using the weighted average algorithm.

Figure 7:
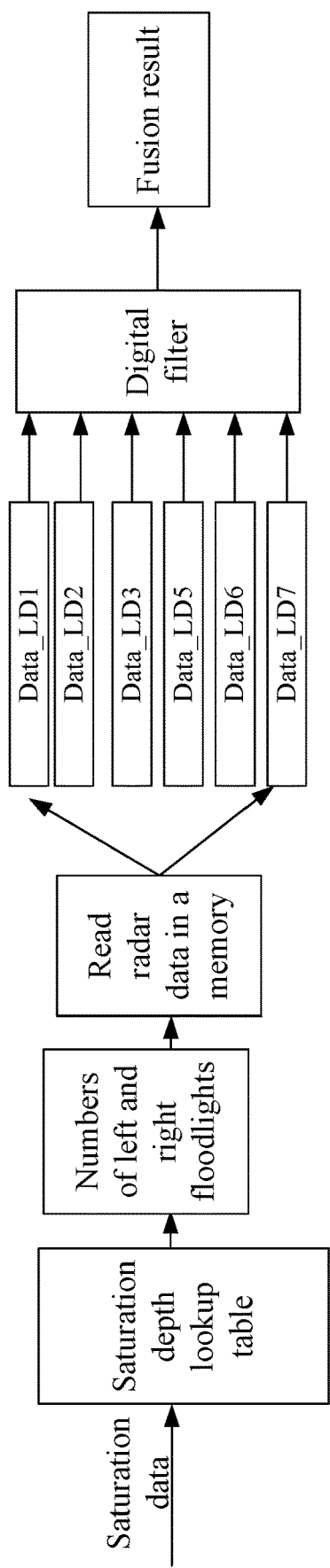
FIG. 7 is a schematic diagram of an application scenario of a radar data processing method according to an embodiment of this application.

For example, as shown in FIG. 7, after the saturation data is input into the saturation depth lookup table, numbers of left and right floodlights can be determined. By reading the radar data in the memory, the floodlight distance value can be determined. By inputting the floodlight distance value into the digital filter for processing, the corresponding fusion result can be output.

It should be noted that, during data fusion, at least one left floodlight or one right floodlight is required, in addition to a main emitter, and therefore, at least two emitters need to be provided.

S13. Determine a distance of a target object based on the fusion result.

In specific application, echo waveform is restored based on the fusion result, to determine the distance of the target object. For this part, refer to an existing echo waveform restoration method and a distance determining algorithm. Details are not described in this application.

It can be seen from the above that, in the radar data processing method provided in this embodiment of this application, in a case that the radar is saturated with the received radar data, the distance of the target object is determined by using the fusion result obtained based on a floodlight distance of irradiating the target object by a floodlight source, which can accurately obtain an actual distance of the target object, effectively reduce a measurement error, improve calculation accuracy, and resolve an existing problem of a large deviation of a measurement result when an actual echo waveform cannot be effectively restored because a signal received by the radar is oversaturated when the laser is directly irradiated on a target object with high reflectivity.

Figure 8:
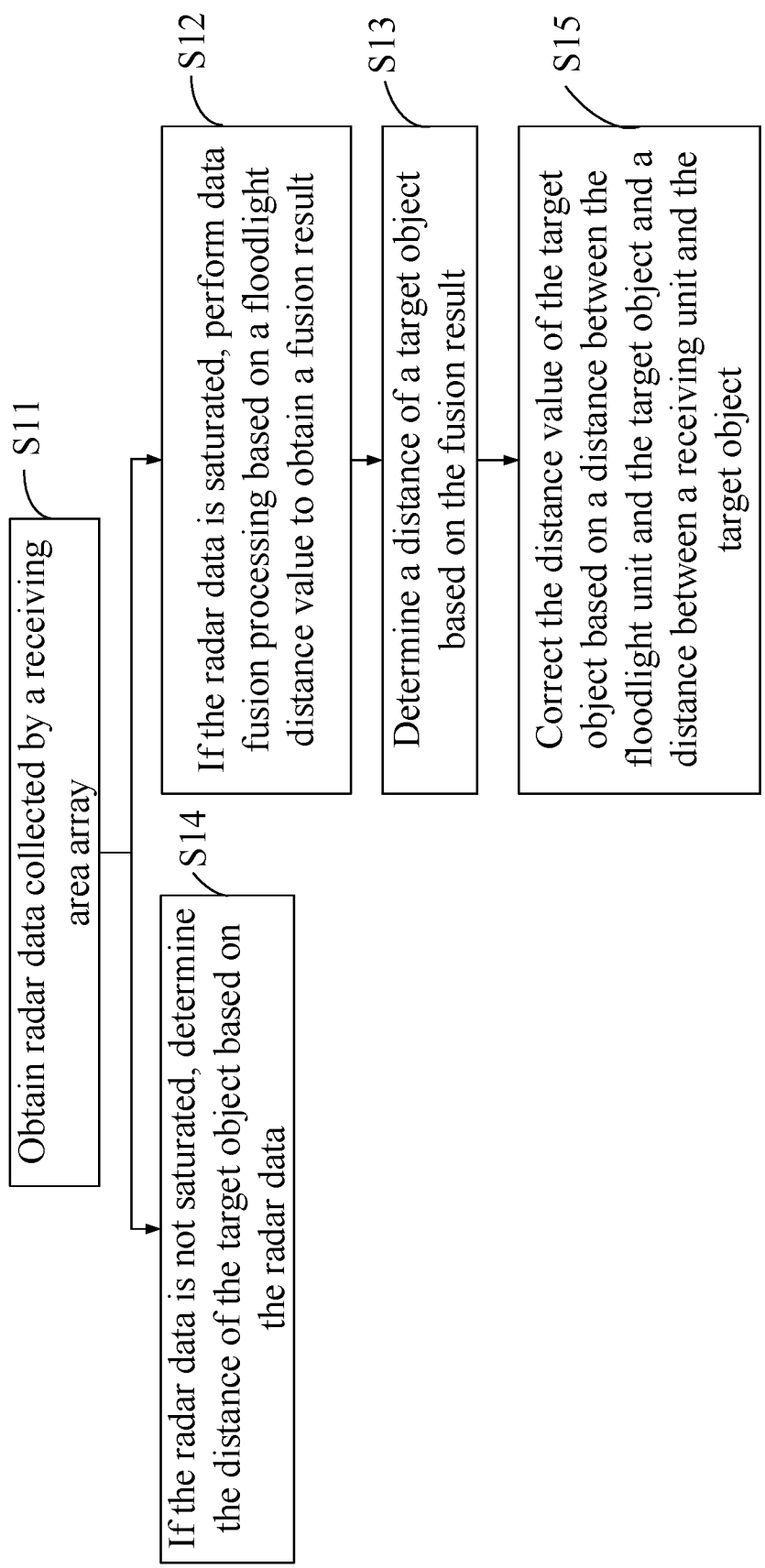
FIG. 8 is a schematic flowchart of another radar data processing method according to an embodiment of this application.

Referring to FIG. 8, in an embodiment of this application, the radar data processing method may further include step S14. Details are as follows:

S14. If the radar data is not saturated, determine the distance of the target object based on the radar data.

In this embodiment of this application, because the radar data is not saturated, an actual echo waveform may be restored accurately. For a method of determining the distance of the target object by restoring the actual echo waveform, refer to an existing echo waveform restoration method and a distance determining algorithm. Details are not described in this application.

Further referring to FIG. 8, in an embodiment of this application, the radar data processing method may further include step S15. Details are as follows:

S15. Correct the distance value of the target object based on a distance between the floodlight unit and the target object and a distance between a receiving unit and the target object.

Figure 9:
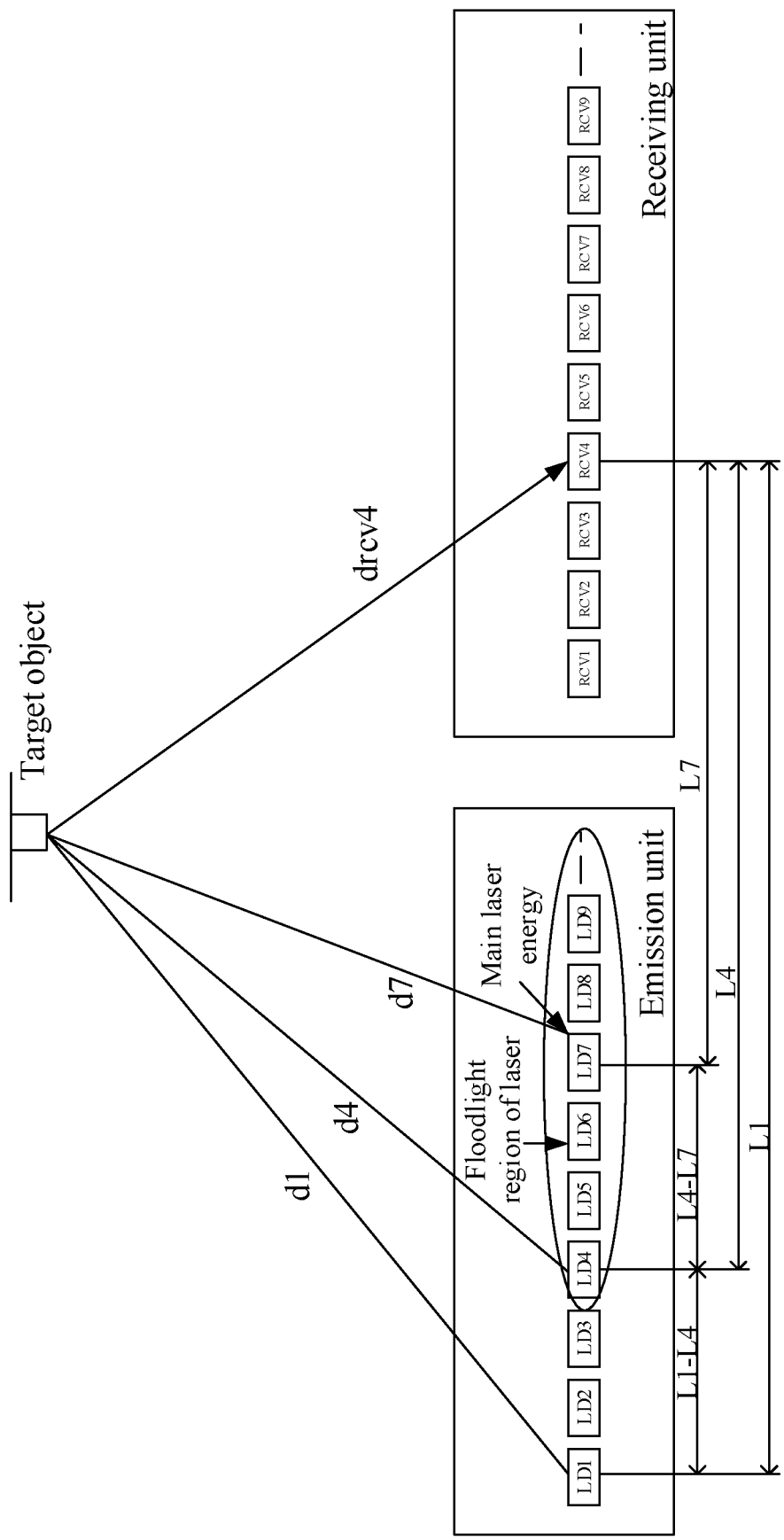
FIG. 9 is a schematic scenario diagram for correcting a distance of a target object according to an embodiment of this application.

In this embodiment of this application, referring to FIG. 9, because there is a certain distance between a main laser energy emitter and an emitter of the floodlight unit, different light sources detect the target object at different angles. As shown in FIG. 9, d1 and d4 are unequal, d7 and d4 are also unequal. To ensure accuracy of the distance of the target object, the distance value of the target object needs to be corrected. Specifically, the correction of the distance value of the target object can be performed based on the distance between the main laser energy emitter and the emitter of the floodlight unit, a distance from the floodlight unit to a receiving unit, and distances from the floodlight unit and the receiving unit respectively to the target object.

For example, when the LD7 is used, a correction formula is as follows:

$$(d4)^2 = (L4)^2 + (drcv4)^2 - (L7)^2 + (drcv4)^2 - (d7)^2)/L7*L4.$$

When the LD1 is used, a correction formula is as follows:

$$(d4)^2 = (L4)^2 + (drcv4)^2 - (L1)^2 + (drcv4)^2 - (d1)^2)/L1*L4.$$

In the above, d4 represents a distance between the emitting unit LD4 and the target object; L4 represents a distance between the emitting unit LD4 and the receiving unit RCV4 (main receiving unit); drcv4 represents a distance between the target object and the receiving unit RCV4; L7 represents a distance between the emitting unit LD7 and the receiving unit RCV4; d7 represents a distance between the emitting unit LD7 and the target object; L1 represents a distance between the emitting unit LD1 and the receiving unit RCV4; and d1 represents a distance between the emitting unit LD1 and the target object. It should be noted that when a difference between the L1 and the L4 is extremely small, a difference between the L4 and the L7 is extremely small, and d1, d4, d7, and drcv4 are much larger than the difference between the L1 and the L4 and the difference between the L4 and the L7, the following formulas can be used as approximate formulas: (d2+d6)/2=d4, (d1+d7)/2=d4, and (d3+d5)/2=d4.

It should be understood that a sequence number of each step in the foregoing embodiments does not mean an execution sequence. An execution sequence of each process should be determined based on a function and internal logic of each process, and should not constitute any limitation to an implementation process of the embodiments of this application.

Based on the radar data processing method provided in the foregoing embodiment, embodiments of this application further provide an embodiment of a terminal device for implementing the foregoing method embodiment.

Figure 10:
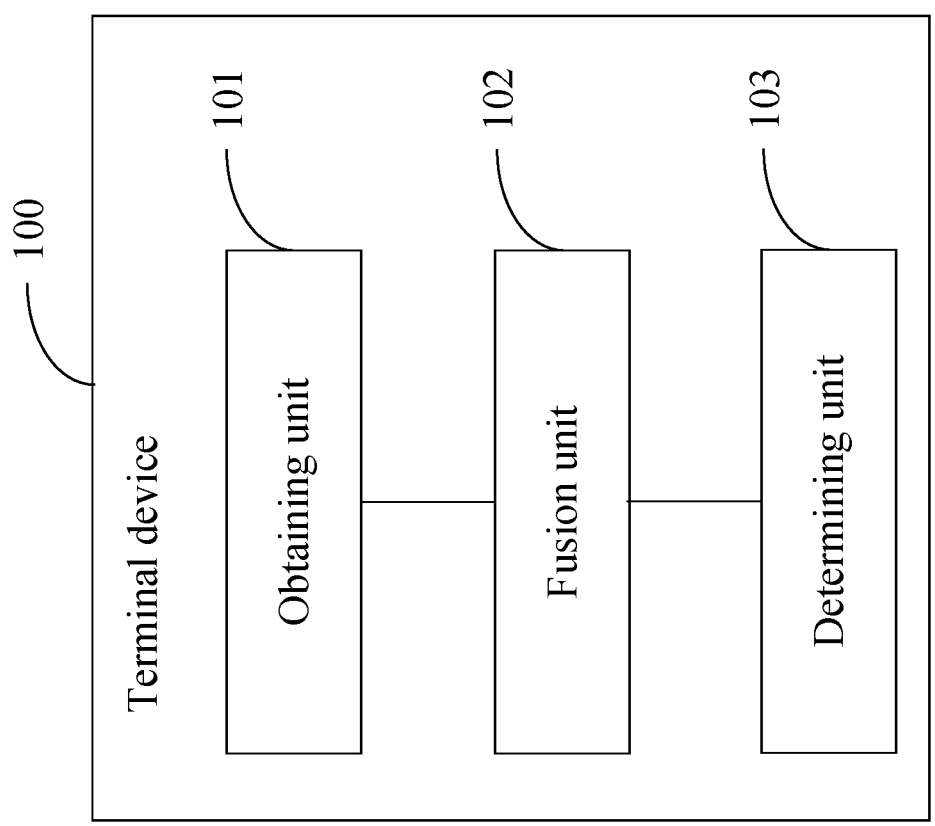
FIG. 10 is a schematic structural diagram of a terminal device according to an embodiment of this application.

Referring to FIG. 10, FIG. 10 is a schematic structural diagram of a terminal device according to an embodiment of this application. In this embodiment of this application, each unit included in the terminal device is configured to perform each step in the embodiment corresponding to FIG. 2. For details, refer to FIG. 2 and related descriptions in the embodiment corresponding to FIG. 2. For ease of description, only a portion related to this embodiment is shown. As shown in FIG. 10, the terminal device 100 includes an obtaining unit 101, a fusion unit 102, and a determining unit 103.

The obtaining unit 101 is configured to obtain radar data collected by a receiving area array.

The fusion unit 102 is configured to: if radar data received by the radar is saturated, perform data fusion processing based on a floodlight distance value to obtain a fusion result.

The determining unit 103 is configured to determine a distance of a target object based on the fusion result.

In this embodiment of this application, the fusion unit 102 includes:

a depth determining unit, configured to determine a saturation depth based on the radar data;

a floodlight determining unit, configured to determine the number of the floodlights based on the saturation depth;

a distance determining unit, configured to obtain a floodlight distance value based on the number of the floodlights; and a data fusion unit, configured to perform data fusion processing based on the floodlight distance value to obtain a fusion result.

In an embodiment of this application, the floodlight determining unit is specifically configured to input the saturation depth into a depth lookup table for searching to obtain the number of the floodlights corresponding to the saturation depth.

In an embodiment of this application, the data fusion unit is specifically configured to input the floodlight distance value into a filter for processing to obtain the fusion result.

In an embodiment of this application, the terminal device further includes: a correction unit, configured to correct the distance value of the target object based on a distance between the floodlight unit and the target object and a distance between a receiving unit and the target object.

It should be noted that content such as information exchange and an execution process between the foregoing units is based on the same concept as the method embodiments of this application. For specific functions and technical effects thereof, reference may be made to the method embodiments. Details are not described herein again.

Figure 11:
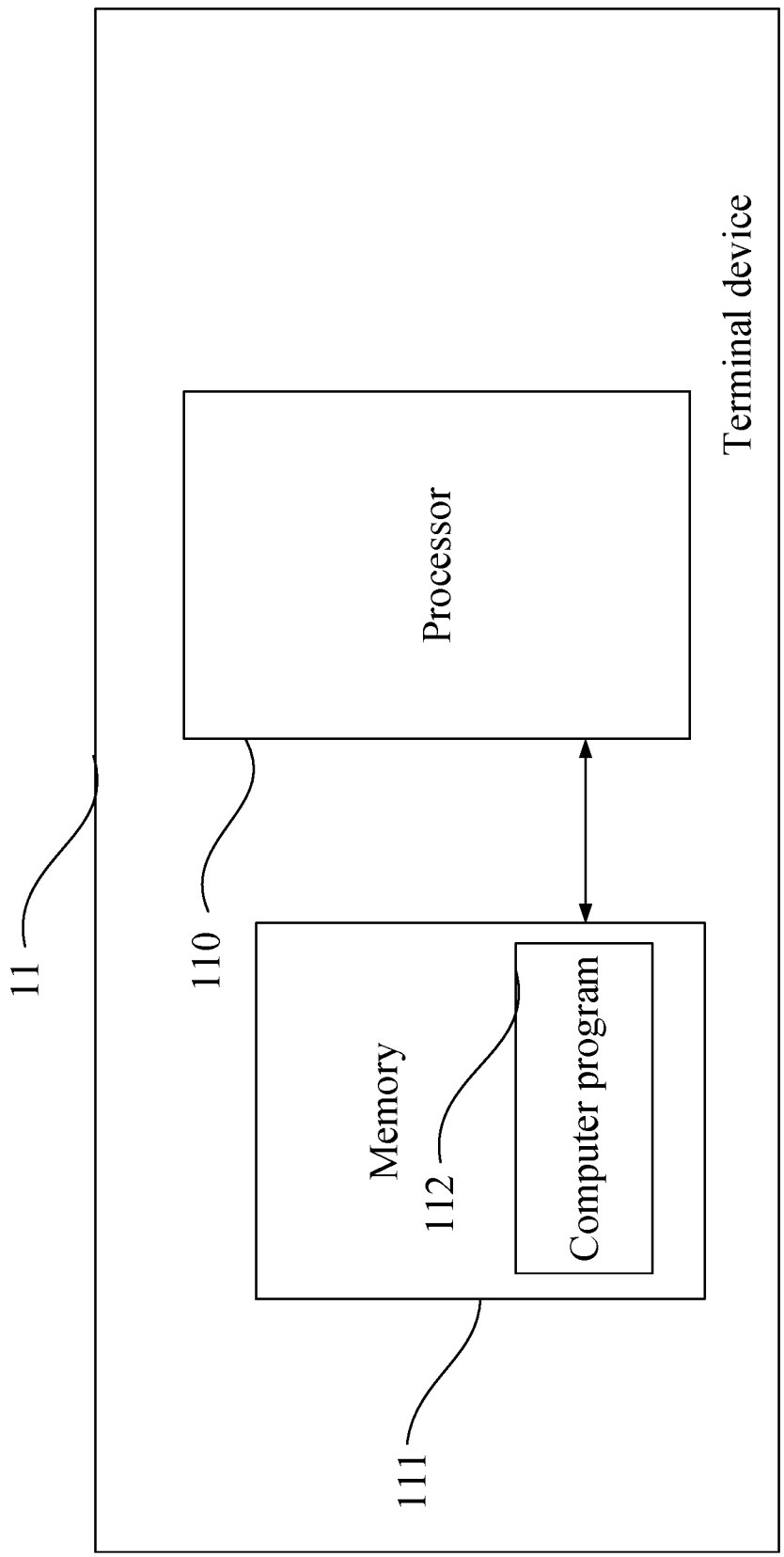
FIG. 11 is a schematic structural diagram of a terminal device according to another embodiment of this application.

FIG. 11 is a schematic structural diagram of a terminal device according to another embodiment of this application. As shown in FIG. 11, the terminal device 11 provided in this embodiment includes: a processor 110, a memory 111, and a computer program 112 stored in the memory 111 and capable of running on the processor 110, for example, an image segmentation program. When executing the computer program 112, the processor 110 performs the steps in each embodiment of the radar data processing method, for example, step S11 to step S13 shown in FIG. 2. Alternatively, when executing the computer program 112, the processor 110 implements functions of the modules or units in each embodiment of the terminal device, for example, functions of the units 101 to 103 shown in FIG. 10.

For example, the computer program 112 may be divided into one or more modules or units, and the one or more modules or units are stored in the memory 111 and are executed by the processor 110 to complete this application. The one or more modules or units may be a series of computer program instruction fields capable of completing specific functions, and the instruction fields are used to describe an execution process of the computer program 112 in the terminal device 11. For example, the computer program 112 may be divided into a first obtaining unit and a first processing unit. For specific functions of the units, refer to relevant descriptions in the embodiment corresponding to FIG. 5. Details are not described herein again.

The terminal device may include, but is not limited to, the processor 110 and the memory 111. A person skilled in the art can understand that FIG. 11 is only an example of the terminal device 11, and does not constitute a limitation on the terminal device 11. The terminal device may include more or fewer components than those shown in the figure, or a combination of some components, or different components. For example, the terminal device may also include input and output devices, a network access device, a bus, and the like.

The processor 110 may be a central processing unit (CPU), or may be other general-purpose processors, a digital signal processor (DSP), an application specific integrated circuit (ASIC), a field-programmable gate array (FPGA) or other programmable logic devices, a discrete gate or transistor logic device, a discrete hardware component, or the like. The general-purpose processor may be a microprocessor, or the processor may be any conventional processor or the like.

The memory 111 may be an internal storage unit of the terminal device 11, such as a hard disk or a memory of the terminal device 11. The memory 111 may alternatively be an external storage device of the terminal device 11, for example, a plug-connected hard disk, a smart media card (SMC), a secure digital (SD) card, or a flash card equipped on the terminal device 11. Further, the memory 111 may alternatively include both the internal storage unit and the external storage device of the terminal device 11. The memory 111 is configured to store the computer program and other programs and data required by the terminal device. The memory 111 can also be configured to temporarily store output data or to-be-output data.

Figure 12:
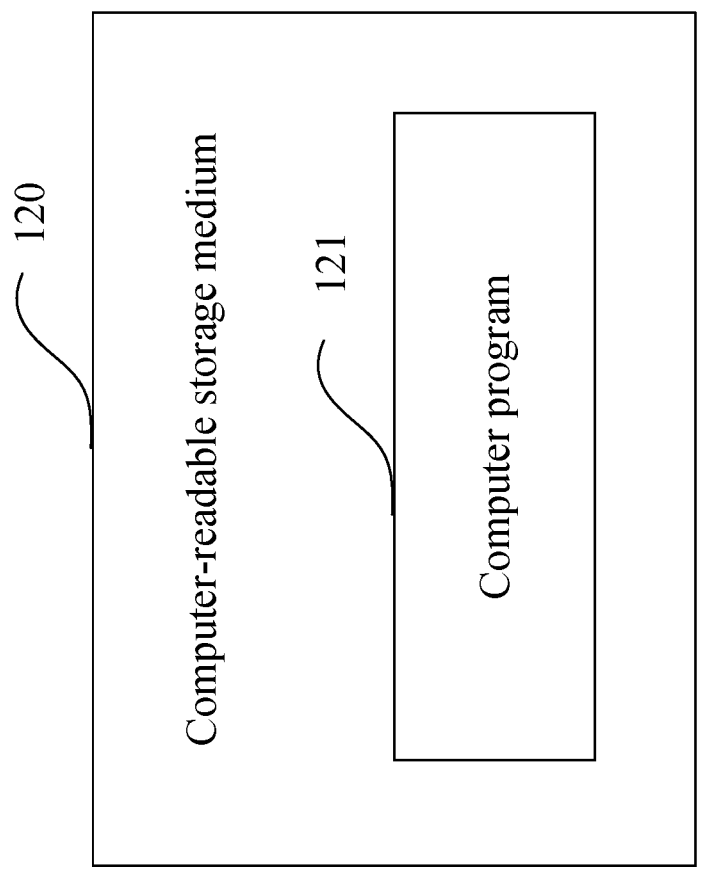
FIG. 12 is a schematic structural diagram of a computer-readable storage medium according to an embodiment of this application.

An embodiment of this application also provides a computer-readable storage medium. Referring to FIG. 12, FIG. 12 is a schematic structural diagram of a computer-readable storage medium according to an embodiment of this application. As shown in FIG. 12, the computer-readable storage medium 120 stores a computer program 121, and when the computer program 121 is executed by the processor, the radar data processing method can be implemented.

An embodiment of this application provides a computer program product, where when the computer program product runs on a terminal device, the terminal device performs the foregoing radar data processing method.

A person skilled in the art can clearly understand that, for ease and brevity of description, division of the foregoing functional units and modules is taken as an example for illustration. In actual application, the foregoing functions can be allocated to different units and modules and implemented according to a requirement, that is, an inner structure of the terminal device is divided into different functional units and modules to implement all or a part of the functions described above. The functional units and modules in the embodiments may be integrated into one processing unit, or each unit may exist alone physically, or two or more units may be integrated into one unit. The integrated unit may be implemented in a form of hardware, or may be implemented in a form of a software functional unit. In addition, specific names of the functional units and modules are only for the convenience of distinguishing one another, and are not intended to limit the protection scope of this application. For a detailed working process of units and modules in the foregoing system, reference may be made to a corresponding process in the foregoing method embodiments. Details are not described again herein.

In the foregoing embodiments, the descriptions of the embodiments have respective focuses. For a part that is not described in detail in one embodiment, reference may be made to related descriptions in other embodiments.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

The foregoing embodiments are merely intended to describe the technical solutions of this application, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A radar data processing method, comprising
obtaining radar data collected by a receiving area array, wherein the radar data is saturated;
determining a saturation depth based on the radar data;
determining a number of floodlights based on the saturation depth;
obtaining a floodlight distance value corresponding to each unit of the floodlights based on the number of the floodlights;
performing data fusion processing based on the floodlight distance value to obtain fusion result; and
determining a distance of a target object based on the fusion result,
wherein an emitting unit comprises multiple emitting diodes or emitting lasers, main energy emitted by the emitting diodes or the emitting lasers corresponds to one or more blocks in a receiving area array of the receiving unit, and floodlight from the light irradiates an adjacent receiving array, and the floodlight distance value is an entire row of received data after each emitter is controlled to emit.

2. The radar data processing method according to claim 1, wherein the determining the number of the floodlights based on the saturation depth comprises:
inputting the saturation depth into a depth lookup table for searching, to obtain the number of the floodlights corresponding to the saturation depth.

3. The radar data processing method according to claim 1, wherein the performing the data fusion processing based on the floodlight distance value to obtain the fusion result comprises:
inputting the floodlight distance value into a filter for processing to obtain the fusion result.

4. The radar data processing method according to claim 1, wherein the radar data is data obtained by controlling a LiDAR to scan in a preset scanning mode, wherein the preset scanning mode means controlling the emitting unit to emit lasers in sequence, and controlling the receiving area array to receive an entire row of data until all array emitters of the emitting unit complete the emission.

5. The radar data processing method according to claim 1, wherein after determining the distance of the target object based on the fusion result, the method further comprises:

correcting the distance value of the target object based on a distance between a unit of the floodlights and the target object and a distance between a receiving unit and the target object.

6. A terminal device, comprising a memory, a processor, and a computer program stored in the memory and capable of running on the processor, wherein when the processor executes the computer program, a radar data processing method according to claim 1 is implemented.

7. A terminal device, comprising:
- a receiving area array, configured to obtain radar data, wherein the radar data is saturated;
- a processor, configured to determine a saturation depth based on the radar data, determine a number of floodlights based on the saturation depth, obtain floodlight distance value corresponding to each unit of the floodlights based on the number of the floodlights, and perform data fusion processing based on the floodlight distance value to obtain fusion result;
- wherein an emitting unit comprises multiple emitting diodes or emitting lasers, main energy emitted by the emitting diodes or the emitting lasers corresponds to one or more blocks in a receiving area array of receiving unit, and floodlight from the light irradiates an adjacent receiving array, and the floodlight distance value is an entire row of received data after each emitter is controlled to emit.

* * * * *